United States Patent [19]

Rautio

[11] Patent Number: 6,163,762
[45] Date of Patent: Dec. 19, 2000

[54] CONFORMAL MESHING FOR ELECTROMAGNETIC ANALYSIS OF PLANAR CIRCUITS

[75] Inventor: James C. Rautio, Phoenix, N.Y.

[73] Assignee: Sonnet Software, Inc., Liverpool, N.Y.

[21] Appl. No.: 09/077,644

[22] PCT Filed: Nov. 27, 1996

[86] PCT No.: PCT/US96/19168

§ 371 Date: May 29, 1998

§ 102(e) Date: May 29, 1998

[87] PCT Pub. No.: WO97/20276

PCT Pub. Date: Jun. 5, 1997

Related U.S. Application Data

[60] Provisional application No. 60/007,856, Dec. 1, 1995.

[51] Int. Cl.$^7$ .............................. G06G 7/48; G06G 7/56; G06F 17/50
[52] U.S. Cl. ..................................... 703/5; 703/4; 703/13
[58] Field of Search ........................ 395/500.23, 500.26; 703/2, 5, 4, 13

[56] References Cited

PUBLICATIONS

Kosanovich et al.; "Modeling of Discontinuities in Microwave and Millemeter Wave Integrated Circuits using the Curvilinear Finite Difference Time Domain Approach"; IEEE MTT–S Inten. Microwave Symp.; pp. 741–744, Jun. 1993.

Kashiwa et al.; "Analysis of Microstrip Antennas an a Curved Surface using the Conformal Grids FD–TD Method"; IEEE Antennas and Propagation Symp.; pp. 34–37, Jul. 1993.

Holland; "Pitfalls of Staircase Meshing"; IEEE Trans. Electro–Comp.; pp. 434–439, Nov. 1993.

Allen W. Glisson/Donald R. Wilton, Simple and Efficient Numerical Methods for Problems of Electromagnetic Radiation and Scattering from Surfaces, IEEE Transactions on Antennas and Propagation, Sep. 1980, vol. AP–28, No. 5.

James C. Rautio/Roger F. Harrington, An Electromagnetic Time–Harmonic Analysis of Shielded Microstrip Circuits, IEEE Transactions on Microwave Theory and Techniques, Aug. 1987, vol. MTT–35 No. 8.

*Primary Examiner*—Kevin J. Teska
*Assistant Examiner*—Hugh Jones
*Attorney, Agent, or Firm*—Harter, Secrest & Emery LLP; Stephen B. Salai, Esq.; Brian B. Shaw, Esq.

[57] ABSTRACT

Conformal meshing is a technique for selecting basis functions such that an accurate representation of the actual current distribution is realized with only a few subsections. This invention relates to conformal meshing, which allows a circuit to be analyzed with an error corresponding to a very small cell size while maintaining the speed normally seen when using a large cell size. Conformal meshing in accordance with this invention bends the subsection to fit the edge of the metal. The current distribution in the subsection is also modified by the introduction of strings, as will be described in more detail later, to accurately represent the high edge current caused by the edge effect. This represents a considerable improvement over existing meshing techniques.

11 Claims, 6 Drawing Sheets

Microfiche Appendix Included
(2 Microfiche, 97 Pages)

Narrow subsections at the edge for high edge current

CONFORMAL MESHING FOR ELECTROMAGNETIC ANALYSIS OF PLANAR CIRCUITS

CROSS-REFERENCES TO RELATED APPLICATIONS

This application claims priority from PCT Application US96/19168, filed Nov. 27, 1996, which in turn claims priority from U.S. Provisional Application No. 60/007,856 filed Dec. 1, 1995 and which are incorporated herein by reference. This application includes a Microfiche Appendix of two (2) sheets of microfiche having ninety-seven (97) frames.

BACKGROUND OF THE INVENTION

1. Field of the Invention

This invention relates generally to the manufacture of three dimensional planar electric circuits, and more particularly to a method and apparatus for determining the characteristics of the circuits at high frequencies by the use of sub-sectional electromagnetic analysis.

The characteristics of three dimensional planar electronic circuits at high frequencies are important both for fabricating microwave circuits, such as micro strip wave guides and the like that are used in the generation, transmission and reception of microwave signals. High frequency electromagnetic characteristics are also increasingly important in digital circuits that operate at ever higher frequencies. Digital circuits operating in a range of 500 mH are common today, and even higher operating frequencies are expected to be common in the future.

2. Description of the Related Art Including Information Disclosed Under 37 C.F.R. §§ 1.97, and 1.98

One method for analyzing arbitrary planar circuits is described by Rautio and Harrington in "An Electromagnetic Time-Harmonic Analysis of Shielded Micro Strip Circuits", *IEEE Transactions of Microwave Theory and Techniques*, Vol., MTT-35, No. 8, August 1987. The circuit metallization is divided into small rectangular sub-sections. We will refer to this dividing as meshing. An explicit surface current distribution is assumed to exist in each subsection. The tangential electric field created by the current in each subsection are determined and the magnitude of the current in all subsections is adjusted, so that the weighted residual of the total tangential electric field goes to zero. The surface currents are then determined, and the electromagnetic characteristics of the circuit are known therefrom.

While meshing a circuit into arbitrarily small rectangles can produce any desired degree of accuracy, the step of adjusting the magnitude of the current in each subsection involves inversion of a matrix whose size increases as the square of the number of subsections. Analysis time becomes expensive, and eventually, the time taken to make the analysis is so long that the desired degree of accuracy cannot be obtained.

There is a need for a method and apparatus for determining the electromagnetic characteristics of 3D planar circuits that permits a greater degree of accuracy to be obtained in a reasonable time than has heretofore been possible. In order to reduce the time needed to characterize the circuit, fewer subsections must be used to represent the circuit. The time required to invert a non-sparse matrix increases with the cube of the number of subsections. In addition, if the dimensions of the subsection are halved, the area of the subsection is one-fourth the size of the original subsection and four times the number of subsections are required to cover the same area. The resulting matrix inversion takes 64 times longer.

This invention greatly increases the accuracy with which the amplitude of the current on a subsection can be determined, by utilizing a new meshing technique that we call conformal meshing. Conformal meshing selects basis functions such that an accurate representation of the actual current distribution in a circuit can be realized with a much smaller number of subsections than has been heretofore possible. Conformal meshing permits a circuit to be analyzed with an error that heretofore would correspond only to meshing with a very small subsize, while maintaining the speed normally seen when using a large cell size.

One method for reducing the number of rectangular subsections is to combine rectangular subsections with triangular subsections. Triangles are used to smooth out stair case edges produced with rectangular subsections. Also, merged rectangles have been used in regions where current changes slowly. More specifically, currents are normally high at the edges of planar circuits at high frequencies, and much lower in the centers of such circuits. By using narrow subsections at the edges to represent the high edge currents and wider subsections in the interior of the circuit where the current is more uniform, the number of subsections can be reduced. A problem arises with this method, however, in that these approaches permit only uniform current distribution across the width of the cell. The current distribution along the length of the cell can vary in a piece-wise linear manner, but if the subsection has the same width as a transmission line, for example, the subsection forces uniform current across the width of the transmission line. In reality, the current is very high at the edges of the line due to the edge effect, and lower and more uniform at the center. This discrepancy between the actual current distribution and the current distribution forced by the use of a single subsection results in about 6% error, which is more than can be tolerated in many applications.

Rectangular and triangular meshing have characterized the piece-wise linear change in current variation along the length of the cell by using "roof-top" functions described by Glisson and Wilton in "Simple and Efficient Numerical Methods for Problems of Electromagnetic Radiation and Scattering from Surfaces", *IEEE Transactions on Antennas and Propagation* Vol. AP-28, No. 5, September 1980.

The present invention generalizes the roof top function, so that it can be used for subsections of arbitrary shape.

It is an object of the invention to greatly reduce the number of subsections required to completely mesh a 3D planar circuit. Conformal meshing in accordance with the invention provides subsections that are bent to fit the edge of the 3D planar circuit. The present invention utilizes subsections in which the current distribution is not uniform from edge to edge, but is modified to accurately represent the high edge currents caused by the edge effect that occurs in circuits operated at high frequencies.

Subsections in accordance with this invention are not limited to simple rectangles and triangles. Subsections used in meshing a curving transmission line can be curved to fit the curving edge of the transmission line, so that the multiplicity of rectangular or triangular subsections heretofore required is no longer needed. By providing subsections that take the high edge current into account, the analysis error obtained through the use of the present invention is much lower than could heretofore be obtained with a similar number of subsections. Because the subsections conform to the edge of the planar 3D circuit, very few subsections are required, and this invention produces the magnitude of error heretofore obtainable only with a large number of small subsections combined with the speed heretofore obtained only with very large subsections (which produce large errors).

BRIEF SUMMARY OF THE INVENTION

Briefly stated, and in accordance with a presently preferred embodiment of the invention, a method for electromagnetic analysis of 3D planar circuits having curved edges by dividing a conducting portion of a planar circuit into a plurality of subsections, calculating the coupling between each pair of adjacent subsections by assuming the current on one subsection and calculating the voltage induced in an adjacent subsection; storing the pair-wise couplings in a matrix, and inverting the matrix to produce the desired result includes the improvement comprising conforming at least one edge of a subsection corresponding to a portion of the planar circuit having a curved boundary to such boundary to produce a subsection having at least one curved edge.

In accordance with a preferred aspect of this invention, the method for electromagnetic analysis includes the further step of dividing at least one subsection having a curved edge into a plurality of strings, each string representing a filament of current having a small width; and assigning weights to the strings corresponding to the known distribution across the width of the planar 3D transmission line.

In accordance with another aspect of this invention, the method of electromagnetic analysis of planar circuits includes dividing at least one subsection having a curved edge into a plurality of strings, each string representing a filament of constant current, having a small width, and assigning weights to the strings corresponding to known current distribution across the width of the planar transmission line.

In accordance with a still further aspect of this invention, the subsection is divided into a plurality of strings having different widths.

In accordance with yet another aspect of this invention, at least one of the strings has a width that varies along its length.

BRIEF DESCRIPTION SEVERAL VIEWS OF THE DRAWINGS

The novel aspects of the invention are set forth with particularity in the appended claims. The invention itself may be more fully comprehended by reference to the following detailed description of a presently preferred embodiment of the invention, taken together with the accompanying drawing, in which:

DETAILED DESCRIPTION OF THE INVENTION

Figure 1:
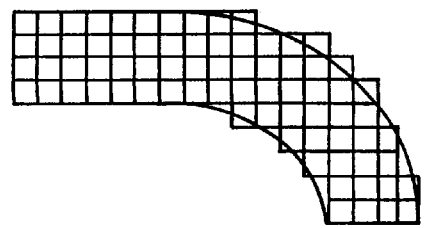
FIG. 1 is a plan view of a curved circuit section showing meshing in accordance with an array of identical cells.

For convenience, the following glossary of terms used in this application is provided:

Basis function. The function used to approximate the current distribution over the area of a given subsection.

Cell. The smallest elemental area of metal which an analysis considers. The smallest possible subsection is one cell.

Conformal meshing. A group of subsections whose area and current distribution conforms to the edges of the metal in a circuit.

Conformal subsection. A subsection whose area and current distribution conforms to the edges of the metal in a circuit. The current density in a conformal subsection includes the edge effect.

Cross-over string. A string which connects one mutual meeting point with a second mutual meeting point on the opposite edge of a planar transmission line.

Current distribution. The density and direction of electric current flow over a given surface or volume.

Eaves. The ends of a roof-top function (or other basis function) where there is zero current.

Eaves edge. The edge of a conformal subsection where current from all strings has linearly tapered down to zero. The eaves edge for one subsection is the peak edge for another subsection.

Edge effect. Electric current preferentially flows along conductor edges. The resulting high current density at the edge of a planar strip is known as the edge effect.

Edge string. A string of current flowing along the outside edge of a subsection.

Funnel. That portion of a string which takes current from a string's normal path (usually along the longitudinal length of a subsection) and diverts it to a mutual meeting point (usually in a transverse direction).

Funnel group. The group of all funnels in a given subsection. The funnel group funnels the current from all strings to the mutual meeting point.

Mesh. The group of subsections which results from meshing.

Meshing. The process of dividing the metal of an entire circuit into subsections.

Mutual meeting point. The cell where multiple strings of current meet so that current may flow easily from any string to any other string ending at the same point.

Open edge. The edge of a conformal subsection where maximum (edge effect) current flows.

Opposite edge. The edge of a conformal subsection opposite the open edge where maximum current flows. (Both open and opposite edges can have edge effect current. However, in general, one subsection can be used to represent only one of these edge effect currents. A second subsection, with the labels "open" and "opposite" exchanged, is used to represent the second edge effect current.)

Overlapping string. Two strings occupy any given string path. The current on one string peaks at one end of the string path and linearly tapers down to the other end. The current on the other string peaks at the other end and linearly tapers down to the first end. In reference to one string, the other is called an overlapping string.

Peak. The position (often in the center) of a roof-top function (or other basis function) where current is a maximum.

Peak edge. The edge in a conformal subsection where current in each string is at a maximum and all strings are funneled into the mutual meeting point.

Planar transmission line. Flat circuit metal which is narrow with respect to wavelength and is long with respect to its width. Also sometimes called a "microstrip", "stripline", PCB (Printed Circuit Board) "trace", or PCB "run".

Roof-top function. A common basis function, or current distribution, used for approximating the actual current distribution over the area of one subsection. It exists over a rectangular area. The length of the subsection is defined by the direction of current flow. The current density is independent of position across the width of the subsection. The current is zero at both ends of the subsection (the "eaves") and is maximum at some position along the length (the "peak", often in the center). The current varies linearly between these points.

Snap grid. A uniform grid covering a rectangular area. In reference to a circuit geometry, all metal edges must be "snapped" to the snap grid when a snap grid is used.

String. A narrow filament of current flowing from one mutual meeting point to another. String path. The path taken by a string within a conformal subsection.

Subsection. A small area of metal. The metal of an entire circuit is divided into subsections in preparation for analysis.

In order to more readily comprehend the present invention, a brief review of electromagnetic analysis of planar circuits will be helpful.

Electromagnetic analysis is an important part of microwave and high frequency circuit design. A review of this field was presented by R. H. Jansen, in "Computer-aided Design Of Microwave And Millimeterwave Integrated Circuits—Progress During The Last Decade And Future Perspectives," 25th European Microwave Conference Proceedings, 1995, pp. 93–100. Such analysis allows engineers to evaluate the performance of a given design. However, there is need for faster analysis, a need for which conformal meshing in accordance with this invention provides an answer.

A subsectional electromagnetic analysis first divides, or meshes, the conducting portion of a planar circuit into small subsections or cells. Generally, smaller subsections result in a more precise answer but, because there are now more subsections, the analysis is slower.

After dividing, or meshing, a circuit into small subsections, the analysis then calculates the coupling between each pair of subsections. Specifically, current is assumed on one subsection and then the voltage induced in another subsection is calculated. This is repeated for all possible pairs of subsections. All of these pair-wise couplings are stored in an N×N matrix where N is the number of subsections. This stage of the analysis is called the "matrix fill". This matrix is then inverted, yielding the desired result.

The importance of using fewer subsections to represent the circuit is seen in the matrix inversion. Matrix inversion (non-sparse) time requirements increase with the cube of the number of subsections. In addition, when subsection dimensions are reduced by half, the area of a subsection is reduced by a quarter. This then requires four times the number of subsections and the resulting matrix inversion takes 64 times longer. This is why it is important to keep the number of subsections as low as possible.

The matrix inversion can be viewed as the determination of the amplitude of the current on each subsection such that boundary conditions are met as closely as possible. The resulting current distribution is determined by multiplying the basis functions (i.e., the current distribution assumed on each subsection) by the matrix inversion calculated subsection amplitude. This weighted sum of basis functions is the calculated current distribution. Any difference between the calculated current distribution and the actual current distribution is error. Normally, error is reduced by using more, and smaller, subsections. Conformal meshing is a technique for selecting basis functions such that an accurate representation of the actual current distribution is realized with only a few subsections.

This invention relates to conformal meshing, which allows a circuit to be analyzed with an error corresponding to a very small cell size while maintaining the speed normally seen when using a large cell size. This represents a considerable improvement over existing meshing techniques.

Very early meshing techniques simply divided a circuit into a large number of equal size rectangular cells as shown in FIG. 1, where a large plurality of generally square cells covers the surface of a portion of a printed circuit wiring trace. When the cell size is reduced for low error, the number of cells needed to completely cover, or mesh the circuit trace grows quickly and analysis soon becomes unrealistically time consuming. More recent meshing techniques added triangles to smooth out "staircase" edges and "merged" rectangles in regions where current changes slowly. Specifically, it is known that current density is extremely high at the edges of a planar circuit (the "edge effect"). Since current is uniform across these "merged" subsections, a large subsection at the edge of a circuit is not desirable. Instead, narrow subsections are used at the edge to represent the very high edge current. Then wider subsections are used in the interior of the circuit where the current is more uniform. In this way, the number of subsections, and the analysis time are reduced.

Figure 2:
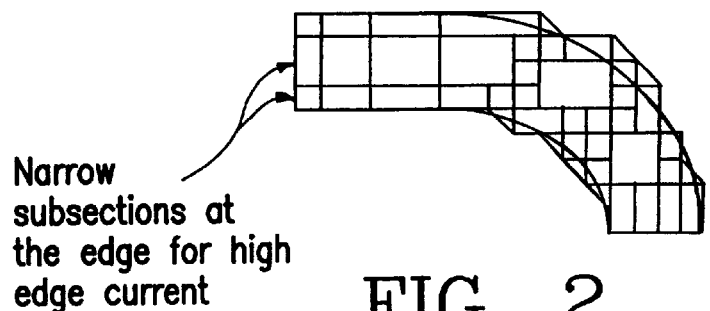
FIG. 2 is the same section showing meshing with unequal size rectangles and triangles, restricted to a snap grid.
Figure 3:
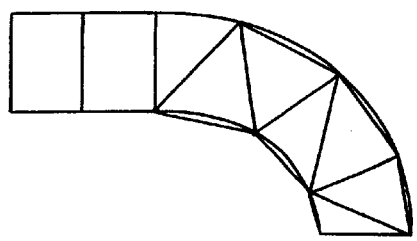
FIG. 3 is the same section shown with a meshing formed from arbitrary sized rectangles and triangles.

There are two ways in which this type of edge intensive meshing can be invoked. It is shown for a fixed underlying snap grid in FIG. 2. In this case, all points on all cell boundaries fall on a fine underlying snap grid, that is not shown because it would obscure the mesh. FIG. 3 shows this same style of meshing when there is no underlying snap grid. Both rectangular and triangular subsections are used in FIG. 3.

Figure 4:
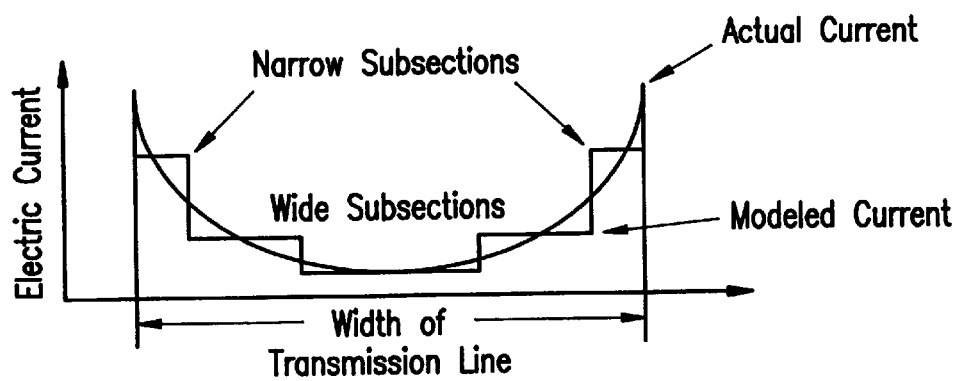
FIG. 4 is a graph showing the current distribution across the width of a transmission line.

In these meshing algorithms, only rectangular and triangular cells are allowed. In addition, only uniform current is allowed across the width of a cell is permitted. Piece wise linear current variation is allowed along the length of a cell, as is discussed later. Thus, if a subsection has the same width as a transmission line, the use of a single subsection forces uniform current across the width of the circuit trace. In reality, the current is very high at the edges of the line due to the edge effect, and low in the center as shown in FIG. 4. This discrepancy between reality and computer model results in about 6% error, too much for many applications This is described by the inventor in "An Ultra-High Precision Benchmark For Validation Of Planar Electromagnetic Analyses," *IEEE Tran. Microwave Theory Tech.*, Vol. 42, No. 11, Nov. 1994, pp. 2046–2050.

Meshing techniques involving rectangles are generally based on "roof-top" functions, first described in "Simple And Efficient Numerical Methods For Problems Of Electromagnetic Radiation And Scattering From Surfaces," *IEEE Trans. Antennas Propagat.*, Vol. AP-28, 1980, pp. 593–603, by A. W. Glisson and D. R. Wilton, and first applied to planar microwave circuits as described by the inventor and R. F. Harrington in "An Electromagnetic Time-Harmonic Analysis Of Shielded Microstrip Circuits," *IEEE Trans. Microwave Theory Tech.*, Vol. MTT-35, pp. 726–730, Aug. 1987 and also in "An Efficient Electromagnetic Analysis Of Arbitrary Microstrip Circuits," *MTT International Microwave Symposium Digest*, Las Vegas, June 1987, pp. 295–298. Conformal meshing is a generalization of the roof-top function to arbitrary subsection shape.

At present, the only way to reduce the error is to use a smaller cell size. This, however, results in a longer analysis time. This problem is solved in accordance with this invention by conformal meshing.

Conformal meshing in accordance with this invention bends the subsection to fit the edge of the metal. The current distribution in the subsection is also modified by the introduction of strings, as will be described in more detail later, to accurately represent the high edge current caused by the edge effect.

Figure 5:
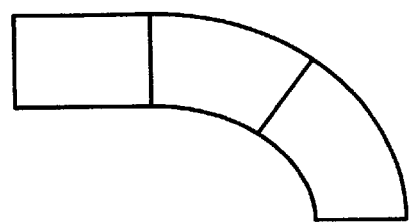
FIG. 5 is a top plan view of the circuit section of FIGS. 1–3 showing conformal meshing in accordance with this invention.

First, the subsections are no longer restricted to simple rectangles and triangles. For example, as shown in FIG. 5 a conformal subsection curves to fit the curving edge of the transmission line. In this way, the numerous subsections of FIG. 2 and FIG. 3 are no longer needed.

However, notice that the entire transmission line width is covered by a single subsection. In previous subsectioning techniques, this would force uniform current across the width of the transmission line. However, a conformal subsection intrinsically includes high current at the edges.

Because the high edge current is included in each subsection, the analysis error is much lower. Because this is done with subsections which conform to the edge of the metal, there are very few subsections. Thus, we achieve the low error of small subsections combined with the analysis speed of large subsections.

The critical problems in building a conformal subsection is to find a structure which:

1. Properly represents actual current flow with low error.
2. Allows current to flow unimpeded from one subsection to the next along the length of the subsection.
3. Allows current to flow from one side to the other across the width of a subsection as needed.

If any one of the above considerations is not met, the mesh fails.

Figure 6:
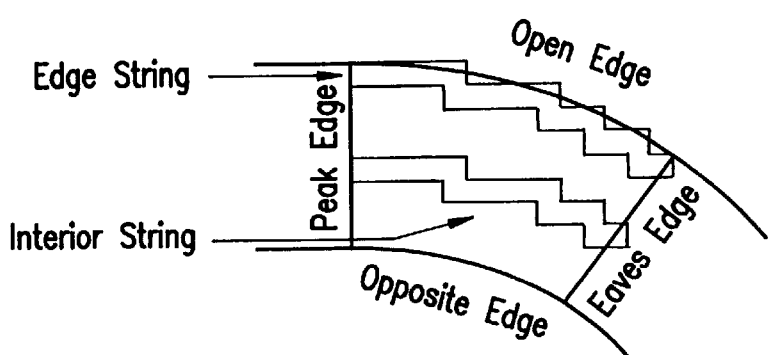
FIG. 6 is an enlarged portion of the circuit of FIG. 5 showing two strings superimposed thereon.

In accordance with this invention, we include within the subsection a structure that we call a "string" as shown in FIG. 6. A string is a filament of current having a small width.

In general the width might vary along the length of the string. A conformal subsection comprises a set of strings placed, usually, adjacent to each other. The string nearest the outer edge or open edge of the subsection has the highest current and is called the edge string. The next string in, towards the center of the subsection, is assigned a lower current relative to the edge string, and so on. The relative weights of each string are assigned based on an assumed current distribution across the width of a planar transmission line. A presently preferred method for assigning weights to the strings is as follows:

Weight of Interior Strings Relative to the Peak String

In order to properly model the high edge current (also known as the "edge singularity"), interior strings are assigned reduced weights relative to the peak (or open edge) string. As an example of one way to do this, we first start with the known current distribution on a thin strip in free space [8]:

$$J(x) = \frac{1}{\sqrt{1 - \left(\frac{2x}{w}\right)^2}} \quad -\frac{w}{2} \le x \le \frac{w}{2}$$

Here, x is the distance from the center of the line and w is the width of the line. J is the current density. Since we are interested in the current as a function of the distance from the edge, we shall use u=x+w/2, or x=u−w/2:

$$J(u) = \frac{1}{\sqrt{1 - \left(\frac{2u-w}{w}\right)^2}} \quad 0 \le u \le w$$

This reduces algebraically to:

$$J(u) = \frac{w}{2\sqrt{uw - u^2}} \quad 0 \le u \le w$$

To determine the total current in a string, we must integrate the current distribution over the width of the string. The integral of the above J(u) is integral number 47 in [9]. It evaluates as:

$$\int J(u)du = \frac{w}{2}a\sin\left(\frac{2u-w}{w}\right) + C$$

Figure 9A:
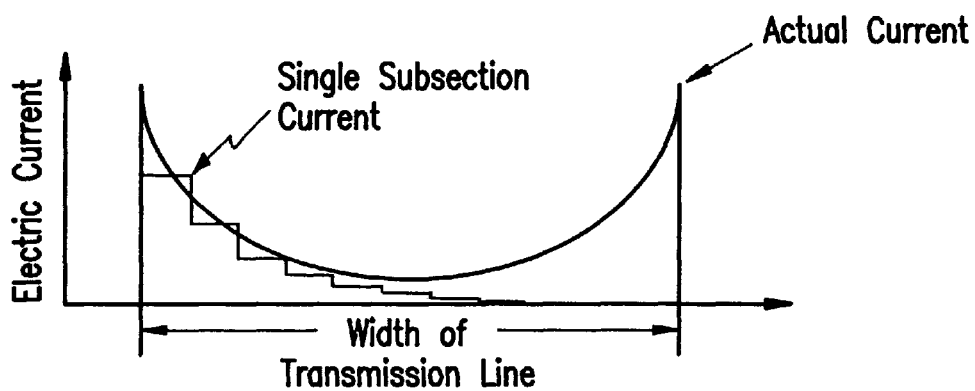
FIG. 9(a–c) are graphical representations of the subsection currents of two overlapping subsections in accordance with this invention superimposed on the actual current.
Figure 9B:
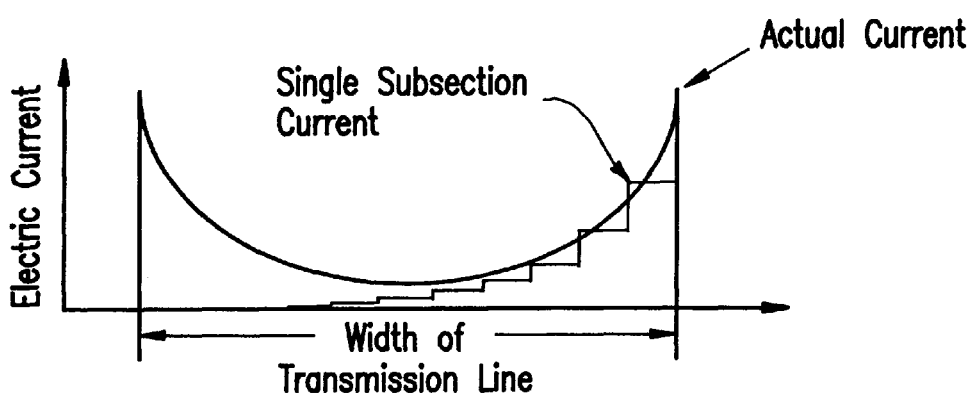
Figure 9C:
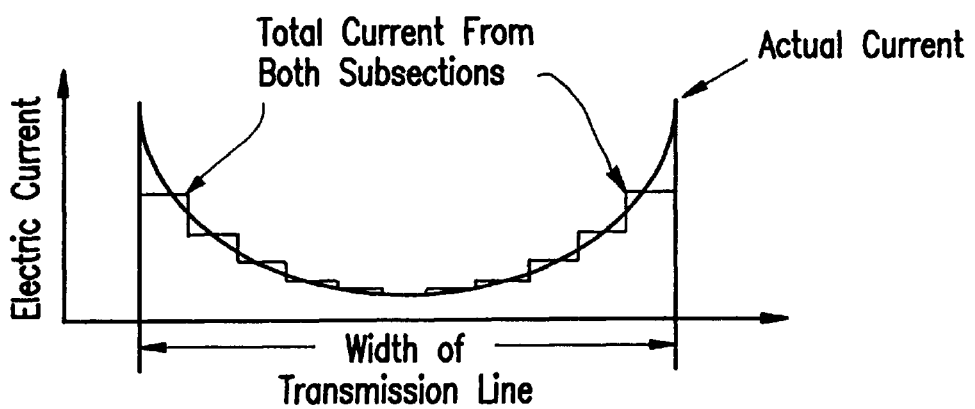

This integral is evaluated at limits a and b, where the string width extends from a to b in distance from the open edge of the subsection. In addition, because there is an overlapping subsection with its peak string on the opposite edge (FIG. 9), the above determined weight is further reduced by a linear taper by the factor of:

$$1 - \frac{u}{w}$$

This is so the subsection for each open edge (FIG. 10) tapers to zero at the opposite edge. For example, in the center (u=w/2), the subsections from each open edge each contribute ½ the total current in the transmission line.

This distribution can be used for lossless and low loss lines. When there is high loss (skin depth on the order of transmission line width) then the high edge current no longer exists and each string should be weighted so that the total current is uniform across the width of the transmission line.

This preferred method includes a representation of the edge effect. If the width of the string varies along its length, then the current density in that string must also be changed so that the total current is left undisturbed.

In accordance with the invention, each string path is used in each of two overlapping subsections simultaneously. For the subsection shown in FIG. 6, each string has maximum current at the peak edge (on the left). The current in each string then decreases linearly as it approaches the eaves edge. FIG. 6 shows only two of about eight strings it would take to cover the subsection.

A second, overlapping subsection uses the same string paths as indicated in FIG. 6. Only now what is indicated as the eaves edge in FIG. 6 becomes the peak edge for the overlapping subsection. Likewise, the peak edge indicated in FIG. 6 becomes the eaves edge for the overlapping subsection. Thus, the overlapping subsection strings have peak current on the right and decrease linearly as they go to the left.

Figure 7:
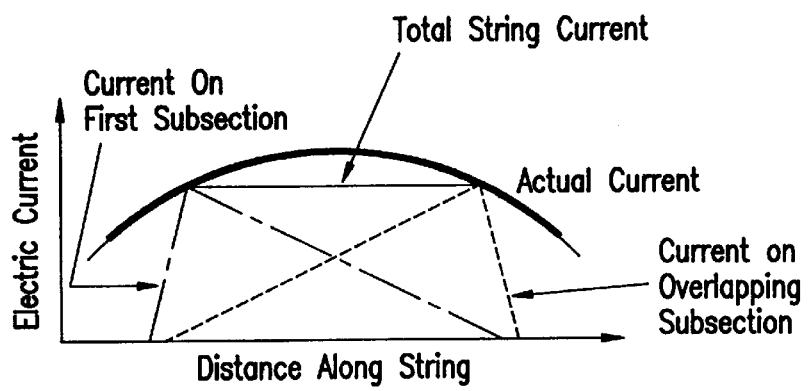
FIG. 7 is a graphical representation showing the actual current flow in the string, together with a piece-wise linear approximation superimposed thereon.

The linear taper in the strings for each subsection (one peaking at the left and tapering to the right, the other peaking at the right and tapering to the left) provides a piece-wise linear representation of the actual current as shown in FIG. 7. Such a piece-wise linear representation of current in the direction of current flow is preferably used for rectangular and triangular subsections. By constructing subsections as described here, the piece-wise linear representation of current is extended to conformal subsections.

In order for current to flow from the subsection on the left to the overlapping subsection on the right as shown in FIG. 6, it is critical that each string in the left subsection be exactly co-located with the corresponding string in each right subsection. In addition, in any given string, when the currents from both the right and left subsections on a given string are added together, the total current must change linearly along the length of the string as shown in FIG. 7. If these conditions are not met, current cannot flow easily from the right subsection to the left subsection and condition 2, above, is not met.

Figure 8:
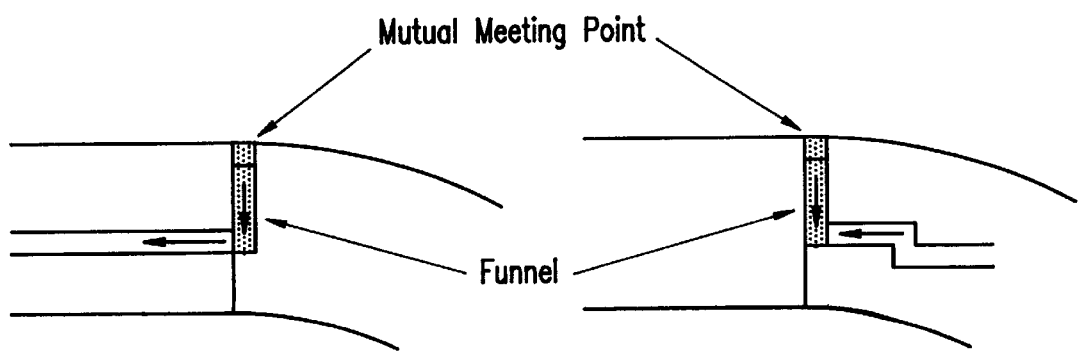
FIG. 8 is an enlarged plan view showing a representative funnel in each of two adjacent non-overlapping subsections.

With the above design, current can easily flow from one overlapping subsection to the next. However, this does not allow current to flow between non-overlapping subsections. To allow current flow between adjacent, but non-overlapping subsections, each string in each subsection is extended to a "mutual meeting point" located on the shared peak boundary as shown in FIG. 8. This extended portion of a string is called a funnel. Unlike the previous portion of the string, the funnel current is constant along its length with current equal to the current at the end of the linearly tapered portion of the string. In addition, since the funnel current is not linearly tapered, the overlapping string ends where the funnel begins.

All the strings in both adjacent subsections are funneled to the mutual meeting point and current may now flow freely from one subsection to the next. The boundary between the two adjacent subsections is called the "peak" edge, because this is where each string has its maximum current. It is advantageous if all funnel strings going to a specific mutual meeting point follow the same path. This is so the funnel currents may cancel if equal and opposite.

The mutual meeting point must allow current to easily flow between any and all strings terminating at the mutual meeting point. This easily assured by using the already established subsectioning techniques shown in FIGS. 1–3.

Note that the rectangular mutual meeting point in FIG. 8 can be treated just like a rectangular subsection of any already established subsectioning technique.

When current flows freely between all overlapping subsections and between all adjacent but non-overlapping subsections, condition 2 is met in its entirety for the entire circuit.

We now consider condition 1, proper representation of the current. The high edge current is properly represented by assigning the edge strings higher current than interior strings, see Appendix I. However, in certain cases, the edge current on one side of a line can be considerably higher than the edge current on the other side.

In order to represent this properly, each open edge must be represented by a separate subsection. In order to allow a smooth transition in the center of the transmission line, the current from a subsection's open edge is gently (linearly) tapered off as it approaches its opposite edge, see FIG. 9. In this way the transition from the (perhaps low) current on one side to the (perhaps high) current on the other side is gradual. This taper is in addition to the edge effect. The taper is not included if there is no opposite edge.

For example, in FIG. 6, the subsection for one open edge would use the indicated open edge. The subsection for the other open edge would use the edge labeled "opposite edge" as its open edge and the edge labeled "open edge" as its opposite edge.

Any transverse current distribution which includes some kind of representation of the edge effect can be used with conformal meshing to set the current on each string.

Now, we consider condition 3, where current flow across the width of a subsection is allowed. This is implemented by including a string which crosses over from the mutual meeting point for the adjacent subsections on one side to the mutual meeting point for the adjacent subsections on the other side, FIG. 10. This string is called a "cross-over" string and is treated as a separate subsection for the purpose of the analysis. Like the funnel strings, the cross-over string ideally follows the peak boundary between the adjacent subsections.

Alternatively, if all subsections sharing the same peak edge also use the same mutual meeting point, no cross-over strings are needed. In this case, any cross-over current can use the mutual meeting point to transfer current from one edge to the other.

Figure 12:
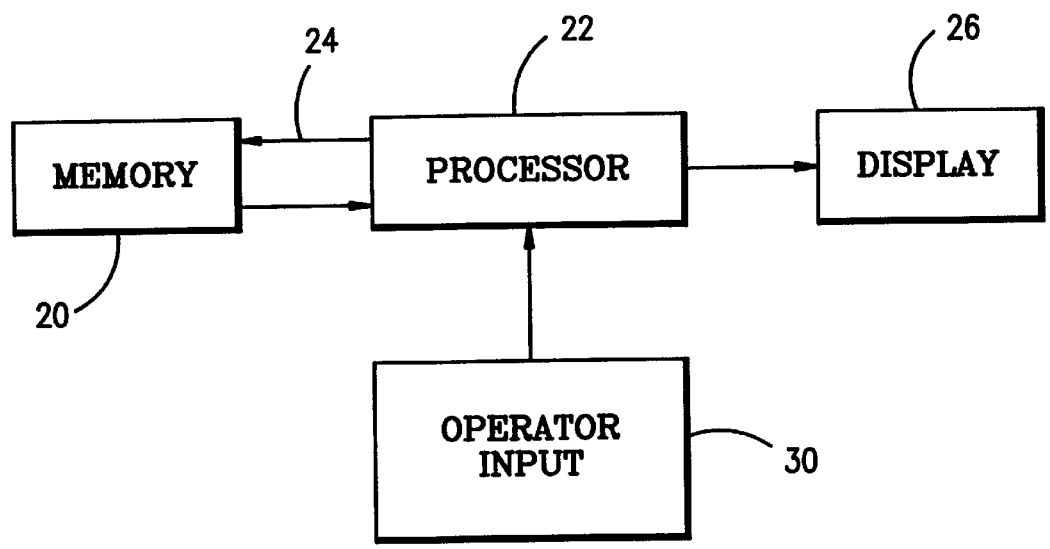
FIG. 12 is a diagram of a computer for carrying out the method of this invention.

FIG. 12 is a diagram of a computer for carrying out the method of this invention. A memory, preferably a random access memory 20 is connected to a processor 22 by a bidirectional data connection 24. The memory 20 contains a data structure that describes the topology of the planar three dimensional circuit to which the method of this invention is applied. A display 26 is connected to the processor, as is an operator input device 30, preferably a keyboard.

In accordance with the invention, a computer program for carrying out the invention is stored in the processor 22 or in the memory 20, or in a separate memory, not shown in the figure.

Figure 13:
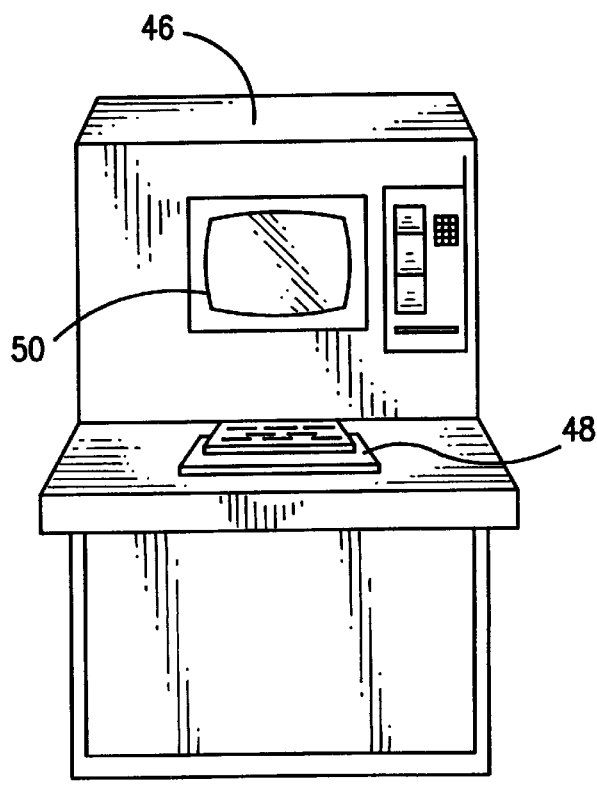
FIG. 13 shows a representative computer in accordance with the invention.

FIG. 13 shows a representative computer in accordance with the invention. The processor 22 and memory 20 are enclosed within a housing 46. The display 26 is arranged behind a viewing window 56, and the keyboard 30 is carried by a platform 48. In accordance with the invention, it is preferred that a user interactively operate the program on the computer. After storing data representing the topology of the planar three dimensional circuit in the memory, preferably from the output of a separate computer program such as an automatic or manual drafting program or the like, the program implementing the method of this invention is invoked with the data representing the topology of the planar three dimensional circuit as input. The operator then enters values representing target hight and width for the conformal subsections on the keyboard. This assists the program in completing the conformal meshing.

The operation of the program then proceeds without operator intervention.

The automated construction of conformal subsections meeting the above criteria in accordance with the invention is described as follows:

1. Assume the circuit geometry has been converted to or provided as a set of simple non-overlapping polygons, i.e., as a list of x, y points. (In a simple polygon, the perimeter does not cross over itself.) Each polygon has open edges and peak edges. Open edges are edges which are not adjacent to any other polygon. Peak edges are adjacent (co-located) with other polygon edges. An example is shown in FIG. 5. Typically, the open edge lengths should be short with respect to wavelength.

Figure 10:
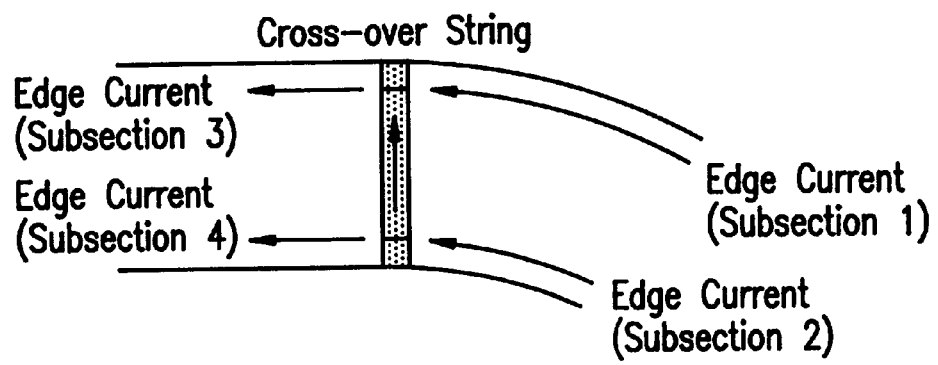
FIG. 10 is a top plan view of a string connecting mutual meeting points on both ends of a peak edge.

2. Form up to four subsections for each peak edge as shown in FIG. 10. There are up to two subsections for each of the two sides of a peak edge. Of these two subsections, one has the edge current string along the open edge at one end of the peak edge. The other subsection has the edge string along the open edge at the other end of the peak edge. If an open edge does not exist at an end of a peak edge, the corresponding subsection is not formed. A peak edge ends where 1) an open edge exists or 2) the selected edge effect current distribution model has gone to zero current. To aid in the performance of this step, determine the following information for each subsection:

a) The location of the peak edge for that subsection.

b) The location of the open edge, along which the edge string is to be positioned.

c) The next peak edge where the strings from this subsection go to zero. This is called the "eaves" edge. Note that the eaves edge for this subsection is the peak edge for an over-lapping subsection.

d) The "opposite" edge, i.e., the edge opposite the open edge of step b. Strings are not allowed beyond the opposite edge and the current in strings near the opposite edge go to zero. The opposite edge for one subsection is the open edge for some other subsection.

3. For each subsection, determine the location of the start and stop of each string. Typically, the start and stop locations are regularly spaced. In general, any appropriate spacing may be used. The start locations are along the peak edge and the stop locations are along the eaves edge.

4. Determine the path to be followed by the edge string. This path goes along the subsection's open edge, starting with maximum current at the peak edge and linearly going to zero current at the eaves edge. Generally, the path should follow the direction of actual current flow. However, small variations (e.g., to follow a snap grid) are allowed. If the width of this, or any other string, varies, the current density must be adjusted so that the total current is unchanged from that of a constant width string.

Figure 11:
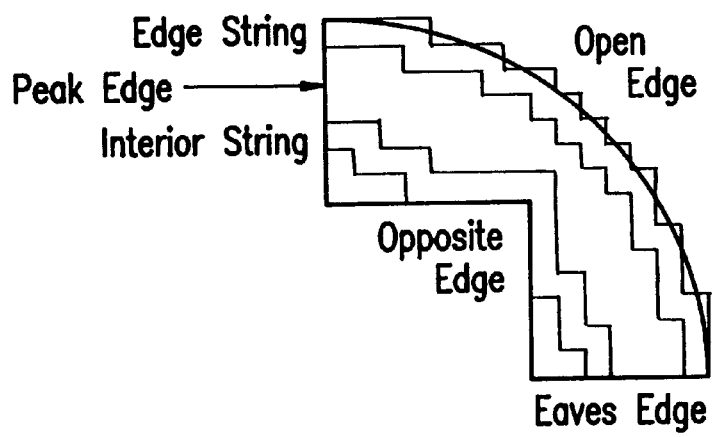
FIG. 11 is a top plan view of another circuit element showing inside and outside edge strings superimposed thereon.

5. Determine the path to be followed by each subsequent string. Usually, this is immediately adjacent to the previously specified string. Each string must be specified with current corresponding to an assumed current distribution which includes the edge effect (see, for example, Appendix I). The string is not allowed to cross the opposite edge. If a string encounters the opposite edge, it must take a new path (usually following the opposite edge) staying within the subsection until it is terminated at the eaves edge or is no longer limited by the opposite edge, FIG. 11. Each string is linearly tapered in a manner similar to the open edge string, having a maximum at the peak edge and going to zero at the eaves edge. The string current at the peak edge is determined by its distance from the open edge and the assumed transverse current distribution. Typically strings farther from the open edge have less current.

6. Extend each string by adding a funnel string from the peak edge end of the string to the mutual meeting point. This point is usually the starting point of the open edge string. It must be the same point for both this subsection and the adjacent subsection which shares the same peak edge. The funnel string has the same current along it's entire length as is present at the peak edge end of the string being funneled to the mutual meeting point. For now, the funnel strings are considered part of the same subsection as the strings which they funnel to the mutual meeting point.

7. Add a cross-over string between any pair of mutual meeting points present on the same peak boundary. The cross-over string has the same current along it's entire length. The cross-over string is a separate subsection. Optionally, the cross-over string may be broken into two subsections, each peaking on one mutual meeting point and linearly ramping down to the other meeting point. This allows the transverse current to vary linearly from one edge to the other. If it is known for a particular circuit that the cross-over current is zero, the cross-over string may be left out.

8. Repeat steps 7–12 for all possible subsections in a circuit. At this point, the conformal meshing can be considered complete. However, a conformal meshing which results in increased accuracy is realized if the following additional steps are performed.

9. Group the funnels from the strings of each given subsection together, one group of funnels per subsection.

10. Calculate the total current from all funnels at the mutual meeting point for each funnel group just determined.

11. When two funnel groups from two adjacent subsections terminate on the same mutual meeting point, move the funnels of one subsection (either one) to the other subsection.

12. Multiply the current in the moved funnel group by a factor so that the total current in the moved funnel group has the same total current and is of opposite sign as compared to the total current in the original funnel group. (One funnel group funnels the current from all the strings of one subsection into the mutual meeting point and the other funnel group funnels the current from the mutual meeting point back out to the strings of the next subsection. Multiplying one funnel group by the factor forces the current being funneled in to be equal to the current being funneled out.)

13. Look for cross-over string subsections which use the same mutual meeting point as the funnel group just moved.

14. Add that same moved funnel group to the cross-over string subsection (if it exists). Multiply the funnel current by a factor so that the total funnel current is equal to and of opposite sign as compared with the cross-over string current.

These additional steps move funnels from one subsection to another. Prior to these additional steps, one subsection funnels its strings into the mutual meeting point. Then, the next subsection funnels its current from the mutual meeting point back out to the strings. If both subsections are determined (by the matrix inversion) to have the same current and the funnel strings are identical, then the funnel current cancels and the total effect is current simply flowing directly from one subsection to the next.

However, if the matrix inversion determines that the current on one subsection is slightly different from the current on the other, then the current on the funnel subsections do not cancel and there is a non-physical transverse current resulting from the lack of complete funnel current cancellation.

By moving the funnels all to one subsection, both funnels cancel if they follow identical paths to identical strings. Any lack of cancellation is now due to the adjacent subsection not having the same number of strings. This lack of cancellation results in a transverse current which is physical, i.e., it represents the current spreading in or out to fill a different width of transmission line.

If even more accuracy is required, one final step can optionally be performed;

15. In any given subsection(s) where more accuracy is desired, especially if confidence in the assumed edge effect current distribution is low, individual strings or groups of strings can be made into separate subsections. The funnels of the strings to be separated must also be removed from the original subsections and placed in the new subsections. Then an additional funnel is added to the string in a manner identical to that used for cross-over strings. While this can be done for any string, it is most advantageous to do this for the edge string because of its very high current.

While increasing the accuracy, this last step also increases the subsection count resulting in increased matrix inversion time. Thus, it should be used only when needed.

Note that if the width of each string is allowed to approach zero and the number of the strings is allowed to approach infinity, in the limit, we have a continuous version of conformal meshing.

At this time the subsectioning is complete and the matrix fill (i.e., calculation of the coupling between each pair of subsections) may proceed using the usual techniques outlined at the beginning of this paper.

While the invention has been described in connection with a presently preferred embodiment thereof, those skilled in the art will recognize that many modifications and changes may be made therein without departing from the true spirit and scope of the invention which is intended to be defined solely by the appended claims.

What is claimed is:

1. A method for determining a current distribution in a planar circuit having a curved boundary, comprising the steps of:
   (a) superimposing a grid consisting of a plurality of rectangular cells over a conductive portion of the planar circuit;
   (b) forming at least two subsections, each comprising a plurality of the rectangular cells, corresponding as closely as possible to the boundary of the planar circuit, without modifying any characteristic of the grid;
   (c) grouping all the cells within each subsection into a plurality of strings, each cell in each of the plurality of strings being related such that if a current flowing through one cell in a string is assumed, the current flowing through every other cell in that string is determinable from that one cell's position in the string;
   (d) assigning a current value to each cell based upon both its position in a string and that string's position within a subsection of the circuit, the current varying piecewise linearly along the length of each string;
   (e) determining all pairwise couplings between subsections;
   (f) storing the couplings in a matrix;
   (g) inverting at least a portion of the matrix;
   (h) using the inverted portion of the matrix to determine the current distribution in the circuit.

2. The method of claim 1, in which the plurality of strings comprises a plurality of strings having different widths, the widths being an integer number of cells wide.

3. The method of claim 1, in which the plurality of strings comprises a plurality of strings at least one of whose width varies along its length.

4. The method of claim 1, in which at least one of said strings overlaps at least two subsections.

5. A method for accurately determining a current distribution in a planar circuit, comprising the steps of:
   (a) dividing a conductive portion of the circuit into a plurality of subsections;
   (b) dividing at least one subsection into a plurality of strings, each string representing a filament of current, at least one of said plurality of strings in each of a pair of adjacent but non overlapping subsections comprising a funnel extending to a common point on a boundary between the subsections for allowing current to flow between the subsections,
   (c) determining the pairwise couplings between subsections;
   (d) storing the couplings in a matrix;
   (e) inverting at least a portion of the matrix;
   (f) using the inverted portion of the matrix to determine the current distribution in the circuit.

6. A method for accurately determining a current distribution in a planar circuit, comprising the steps of
   (a) dividing a conductive portion of the circuit into a plurality of subsections;
   (b) dividing at least one subsection into a plurality of strings, each string representing a filament of current,
   (c) assigning weights to the strings corresponding to a known current distribution across the width of a planar transmission line, in which each of at least two open edges of a portion of the transmission line are represented by a separate subsection, and the currents from each open edge taper linearly towards the other open edge so that the sum of the currents of the two separate subsections combine to accurately represent the current in the center of the portion of the transmission line;
   (d) determining the pairwise couplings between subsections;
   (e) storing the couplings in a matrix;
   (f) inverting at least a portion of the matrix;
   (g) using the inverted portion of the matrix to determine the current distribution in the circuit.

7. The method of claim 6 further comprising extending a cross-over string from a mutual meeting point for adjacent subsections on one side of a transmission line to a mutual meeting point for adjacent subsections on an opposite side of the transmission line.

8. In a data processing system, a method of measuring the impedance of a three dimensional planar electrical circuit at a high frequency comprising the steps of:
   storing a datafile in a computer memory representing the topology of the electrical circuit;

meshing the circuit into a plurality of subsections that conform to the edges of the circuit;

dividing each subsection into a plurality of strings extending from a first edge of the subsection to a second edge of the subsection, wherein the current varies piecewise linearly along the length of each string;

assuming a peak current value for each string based upon that string's position within the circuit, the peak value located at one end of the string assigning the peak value to one end of the string and assigning a zero value to the other;

calculating each subsection's current distribution based upon the current calculated in each of the plurality of strings within that subsection;

using a computer processor to calculate all the pairwise couplings between subsections;

storing the pairwise couplings in a matrix in the memory;

using a computer processor connected to the memory to invert at least a portion of the matrix; and storing the inverted portion of the matrix representing the electromagnetic characteristics of the circuit in the memory.

9. The method of claim 8 comprising displaying the electromagnetic characteristics of the circuit on a computer display in which areas of the circuit in which relatively high currents flow are displayed in a different color than areas of the circuit in which relatively lower currents flow.

10. The method of claim 1 in which the circuits are planar.

11. The method of claim 1, where each string of the plurality of strings is one cell wide.

* * * * *